US009046747B2

(12) United States Patent
Furui

(10) Patent No.: US 9,046,747 B2
(45) Date of Patent: Jun. 2, 2015

(54) IMAGE PROCESSING APPARATUS, PROJECTOR, IMAGE PROCESSING METHOD, AND COMPUTER PROGRAM

(71) Applicant: SEIKO EPSON CORPORATION, Tokyo (JP)

(72) Inventor: Shiki Furui, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days.

(21) Appl. No.: 14/204,523

(22) Filed: Mar. 11, 2014

(65) Prior Publication Data

US 2014/0285725 A1  Sep. 25, 2014

(30) Foreign Application Priority Data

Mar. 22, 2013  (JP) ................................. 2013-060539

(51) Int. Cl.
*H04N 9/28* (2006.01)
*G03B 21/14* (2006.01)
(52) U.S. Cl.
CPC .................... *G03B 21/147* (2013.01)
(58) Field of Classification Search
USPC ................. 348/744–747, 725; 353/69, 70
See application file for complete search history.

(56) References Cited

U.S. PATENT DOCUMENTS

| 6,431,711 | B1* | 8/2002 | Pinhanez ........................ 353/69 |
| 6,834,965 | B2* | 12/2004 | Raskar et al. .................. 353/94 |
| 7,104,653 | B2 | 9/2006 | Moriwaki et al. |
| 7,233,707 | B2* | 6/2007 | Matsuda et al. ............. 382/275 |
| 7,794,094 | B2* | 9/2010 | Birmingham ................ 353/122 |
| 7,857,461 | B2* | 12/2010 | Kondo et al. .................. 353/69 |
| 7,901,094 | B2* | 3/2011 | Tan et al. ..................... 353/121 |
| 2003/0098957 | A1* | 5/2003 | Haldiman ...................... 353/69 |
| 2005/0073661 | A1* | 4/2005 | Tamura ......................... 353/70 |
| 2012/0127323 | A1* | 5/2012 | Kasuya et al. ............... 348/189 |
| 2013/0057707 | A1* | 3/2013 | Hasegawa et al. ........... 348/189 |

FOREIGN PATENT DOCUMENTS

JP  B2-3914891  5/2007

* cited by examiner

*Primary Examiner* — Paulos M Natnael
(74) *Attorney, Agent, or Firm* — Oliff PLC

(57) ABSTRACT

An image processing apparatus includes a projection control section configured to cause a projecting device, which projects an image on a projection surface, to project an image for correction including at least six correction points, a changing section configured to change, according to an instruction of a user, the position of at least one correction point among the at least six correction points projected on the projection surface by the projection control section, and a determining section configured to determine the position of the at least one correction point among the at least six correction points such that, when the image for correction is divided into a first image and a second image by a straight line connecting two correction points among the at least six correction points, the image for correction maintains a continuous shape in a joining portion of the first image and the second image.

10 Claims, 6 Drawing Sheets

IMAGE PROCESSING APPARATUS, PROJECTOR, IMAGE PROCESSING METHOD, AND COMPUTER PROGRAM

The entire disclosure of Japanese Patent Application No. 2013-060539, filed Mar. 22, 2013 is expressly incorporated by reference herein.

BACKGROUND

1. Technical Field

The present invention relates to an image processing apparatus, a projector, an image processing method, and a computer program.

2. Related Art

When a projector is set to deviate from an ideal positional relation with a screen, distortion occurs in an image projected on the screen. When a surface on which an image is projected is not a plane, distortion also occurs in the projected image. Therefore, it is known that a function for correcting the distortion of the projected image using projective transformation is provided in the projector. Japanese Patent No. 3914891 discloses that a shape of a figure after transformation is calculated using an approximate expression (a parabolic expression) set in advance to correct distortion of a projected image due to a shape of a projection surface of a columnar screen and various parameters (variable values) necessary for image transformation and optical correction such as a variable for transformation in the lateral direction or a variable for transformation for the longitudinal direction input from a user interface to transform the approximate expression, an optical center, linearity, amplitude, or a position.

When an image is projected to extend across two surfaces (a "first surface" and a "second surface") crossing each other at an angle, to form a projected image in a shape easy to see as a whole, it is necessary to apply, with different parameters, distortion correction to a portion projected on the first surface and a portion projected on the second surface in the projected image. When one continuous original image is divided into two portions and the distortion correction is applied to the respective portions with the different parameters in this way, as shown in FIG. 9, deviation sometimes occurs in the image in a portion of a line of intersection of the two surfaces.

SUMMARY

An advantage of some aspects of the invention is to provide a technique for reducing, when respective two portions obtained by dividing a projected image by a straight line are individually subjected to distortion correction, deviation of the image that could occur on a straight line where the two portions are in contact with each other.

An aspect of the invention is directed to an image processing apparatus including: a projection control section configured to cause a projecting device, which projects an image on a projection surface, to project an image for correction including at least six correction points; a changing section configured to change, according to an instruction of a user, the position of at least one correction point among the at least six correction points projected on the projection surface by the projection control section; and a determining section configured to determine the position of the at least one correction point among the at least six correction points such that, when the image for correction is divided into a first image and a second image by a straight line connecting two correction points among the at least six correction points, the image for correction maintains a continuous shape in a joining portion of the first image and the second image. According to the image processing apparatus, when respective two portions obtained by dividing a projected image by a straight line are individually subjected to distortion correction, it is possible to reduce deviation of the image that could occur on a straight line where the two portions are in contact with each other.

In a preferred aspect of the invention, the image processing apparatus may further include a processing section configured to perform, on the basis of the position of the correction point determined by the determining section, distortion correction processing for the image for correction that the projection control section causes the projecting device to project. According to the image processing apparatus with this configuration, when respective two portions obtained by dividing a projected image by a straight line are individually subjected to distortion correction, it is possible to perform distortion correction for preventing deviation of the image that could occur on a straight line where the two portions are in contact with each other.

In a preferred aspect of the invention, the changing section may limit, concerning the at least one correction point among the at least six correction points, a direction the correction point can be moved according to an instruction of the user. According to the image processing apparatus with this configuration, it is possible to prevent, when the user moves the correction point, the projected image from deviating on the straight line where the two portions are in contact with each other.

In a preferred aspect of the invention, the at least six correction points may include six correction points located on an outer frame of the image for correction, the first image may be a rectangular image formed by four correction points including two correction points located on the straight line, and the second image may be a rectangular image formed by four correction points including two correction points other than the four correction points among the six correction points and the two correction points located on the straight line. When the straight line is represented as first straight line, a straight line connecting the two correction points other than the two correction points located on the first straight line among the four correction points forming the first image is represented as second straight line, and a straight line connecting the two correction points other than the two correction points located on the first straight line among the four correction points forming the second image is represented as third straight line, the determining section may determine the position of the at least one correction point among the six correction points such that the first straight line, the second straight line, and the third straight line cross at one point. According to the image processing apparatus with this configuration, it is possible to prevent, when the user moves the correction point, the projected image from deviating on the straight line where the two portions are in contact with each other.

In a preferred aspect of the invention, the changing section may limit, concerning any one correction point among the six correction points, a direction in which the correction point can be moved according to an instruction of the user to a first direction set in advance and determine a coordinate of the correction point in a second direction set in advance on the basis of the positions of the correction points other than the correction point. According to the image processing apparatus with this configuration, it is possible to prevent, when the user moves the correction point, the projected image from deviating on the straight line where the two portions are in contact with each other.

In a preferred aspect of the invention, the changing section may limit, concerning any one of two correction points located on the first straight line, two correction points located on the second straight line, and two correction points located on the third straight line, a direction in which the correction points can be moved according to an instruction of the user to a first direction set in advance and determine coordinates of the two correction points in a second direction set in advance respectively on the basis of the positions of the correction points other than the two correction points. According to the image processing apparatus with this configuration, it is possible to prevent, when the user moves the correction points, the projected image from deviating on the straight line where the two portions are in contact with each other.

In a preferred aspect of the invention, the projection control section may cause, concerning the correction point, the position of which is determined by the determining section, the projecting device to project an image representing guidance for bringing the position of the correction point, which the projection control section causes the projecting device to project, close to the position determined by the determining section. According to the image processing apparatus with this configuration, when respective two portions obtained by dividing the projected image by a straight line are individually subjected to distortion correction, it is possible to provide the user with guidance for preventing deviation of an image that could occur on the straight line where the two portions are in contact with each other.

Another aspect of the invention is directed to a projector including: a projecting device configured to project an image on a projection surface; a projection control section configured to cause the projecting device to project an image for correction including at least six correction points; a changing section configured to change, according to an instruction of a user, the position of at least one correction point among the at least six correction points projected on the projection surface by the projection control section; and a determining section configured to determine the position of the at least one correction point among the at least six correction points such that, when the image for correction is divided into a first image and a second image by a straight line connecting two correction points among the at least six correction points, the image for correction maintains a continuous shape in a joining portion of the first image and the second image. According to the projector, when respective two portions obtained by dividing a projected image by a straight line are individually subjected to distortion correction, it is possible to reduce deviation of the image that could occur on a straight line where the two portions are in contact with each other.

Still another aspect of the invention is directed to an image processing method including: causing a projecting device, which projects an image on a projection surface, to project an image for correction including at least six correction points; changing, according to an instruction of a user, the position of at least one correction point among the at least six correction points projected on the projection surface; and determining the position of the at least one correction point among the at least six correction points such that, when the image for correction is divided into a first image and a second image by a straight line connecting two correction points among the at least six correction points, the image for correction maintains a continuous shape in a joining portion of the first image and the second image. According to the image processing method, when respective two portions obtained by dividing a projected image by a straight line are individually subjected to distortion correction, it is possible to reduce deviation of the image that could occur on a straight line where the two portions are in contact with each other.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
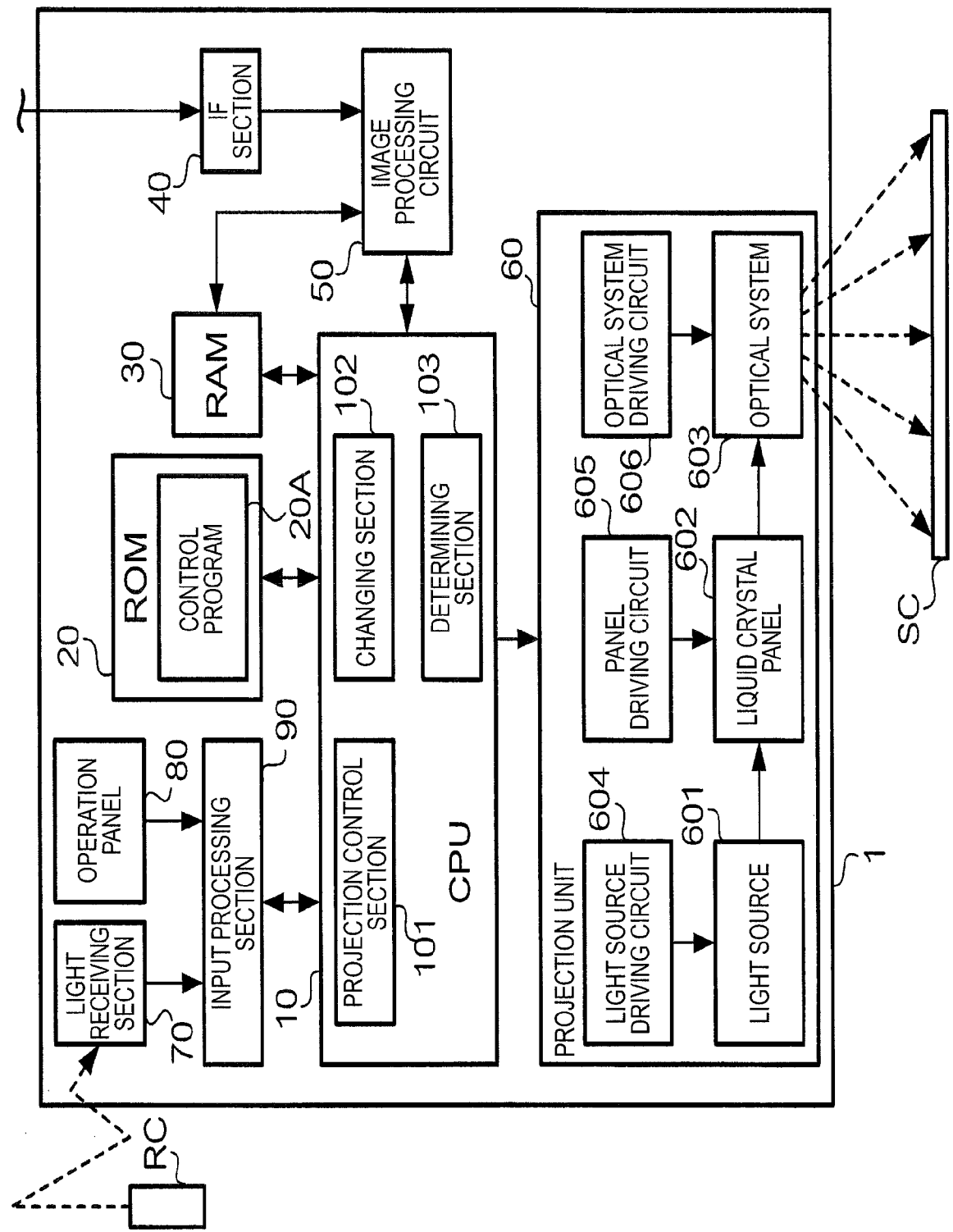
FIG. 1 is a block diagram showing the internal configuration of a projector.

FIG. 1 is a block diagram showing the internal configuration of a projector 1 according to an embodiment of the invention. A controller RC shown together with the projector 1 in FIG. 1 is a device for controlling the projector 1 by radio such as infrared communication, i.e., a so-called remote controller.

The projector 1 is an apparatus that projects an image corresponding to an input video signal (hereinafter referred to as "main image") on a screen SC. The screen SC used in this embodiment is a bent screen configured by two surfaces (a line of intersection of which is in the vertical direction) crossing each other at an angle. In the following explanation, when the two surfaces configuring the screen SC are distinguished, the two surfaces are referred to as "left surface" and "right surface". When a projection axis of the projector 1 is tilted from an ideal state with respect to the screen SC, the main image projected on the screen SC is distorted as a whole. The projector 1 has a function of correcting the distortion of the entire main image by individually applying distortion correction to a portion mainly projected on the left surface and a portion mainly projected on the right surface in the main image projected on the screen SC (hereinafter referred to as "distortion correction processing").

The projector 1 includes an adjustment state, which is a state for a user to operate the controller RC or an operation panel 80 (explained below) to input parameters for the distortion correction processing. In the adjustment state, the projector 1 projects, on the screen SC, an image functioning as a user interface for the user to input the parameters for the distortion correction processing (hereinafter referred to as "image for correction"). A plurality of correction points serving as references are set on the image for correction. The user can input the parameters for the distortion correction processing by operating the controller RC or the operation panel 80 to change the positions of the correction points. Specific examples of the parameters for the distortion correction processing and the correction points are explained below.

The projector 1 includes a CPU (Central Processing Unit) 10, a ROM (Read Only Memory) 20, a RAM (Random Access Memory) 30, an IF (interface) section 40, an image processing circuit 50, a projection unit (an example of a projecting device) 60, a light receiving section 70, an operation panel 80, and an input processing section 90. The CPU 10 is a control device configured to control the sections of the projector 1 by executing a control program. The ROM 20 is a storage device having stored therein various computer programs and data. The ROM 20 stores therein a control program 20A executed by the CPU 10 and image data for correction indicating an image for correction. The RAM 30 is used as a work area when the CPU 10 executes the computer programs stored in the ROM 20. The IF section 40 acquires a video signal from an external apparatus such as a DVD (Digital Versatile Disc) player or a personal computer. The IF section 40 includes various terminals (e.g., a USB (Universal Serial Bus) terminal, a LAN (Local Area Network) terminal, an S terminal, an RCA terminal, a D-sub (D-subminiature) terminal, an HDMI (registered trademark) (High-Definition Multimedia Interface) terminal, and the like) for connecting the projector 1 to the external apparatus. The IF section 40 extracts vertical and horizontal synchronization signals from the acquired video signal. The image processing circuit 50 applies image processing to an image indicated by the video signal.

The projection unit 60 includes a light source 601, a liquid crystal panel 602, an optical system 603, a light source driving circuit 604, a panel driving circuit 605, and an optical system driving circuit 606. The light source 601 includes a lamp such as a high pressure mercury lamp, a halogen lamp, or a metal halide lamp or another light emitting body and irradiates the liquid crystal panel 602 with light. The liquid crystal panel 602 is a light modulating device configured to modulate, according to image data, the light with which the light source 601 irradiates the liquid crystal panel 602. In this example, the liquid crystal panel 602 includes a plurality of pixels arranged in a matrix shape. The liquid crystal panel 602 has, for example, resolution of an XGA (eXtended Graphics Array) and includes a display region configured by 1024×768 pixels. In this example, the liquid crystal panel 602 is a transmissive liquid crystal panel. The transmittance of the pixels is controlled according to image data. The projector 1 includes three liquid crystal panels 602 corresponding to the three primary colors of RGB. The light from the light source 601 is separated into color lights of the three colors of RGB. The color lights are made incident on the liquid crystal panels 602 corresponding thereto. The color lights transmitted through the liquid crystal panels 602 to be modulated are combined by a cross dichroic prism or the like and emitted to the optical system 603. The optical system 603 includes a lens for magnifying the light modulated into image light by the liquid crystal panels 602 and projecting the light on the screen SC, a zoom lens for performing enlargement and reduction of an image to be projected and adjustment of a focus, a motor for zoom adjustment for adjusting a degree of zooming, and a motor for focus adjustment for performing adjustment of a focus. The light source driving circuit 604 drives the light source 601 according to the control by the CPU 10. The panel driving circuit 605 drives the liquid crystal panels 602 according to image data output from the CPU 10. The optical system driving circuit 606 drives the motors included in the optical system 603 according to the control by the CPU 10.

The light receiving section 70 receives an infrared signal transmitted from the controller RC, decodes the received infrared signal, and outputs the infrared signal to the input processing section 90. The operation panel 80 includes buttons and switches for turning on and off a power supply of the projector 1 and performing various kinds of operation. The input processing section 90 generates information indicating operation content by the controller RC or the operation panel 80 and outputs the information to the CPU 10.

The CPU 10 executes the computer program stored in the ROM 20 to thereby realize a projection control section 101, a changing section 102, and a determining section 103. The projection control section 101 outputs data representing an image for correction (hereinafter referred to as "image data for correction") to the projection unit 60 at timing indicated by a synchronization signal. In this embodiment, a rectangular image is used as the image for correction. The projection unit 60 projects the image for correction on the screen SC according to data supplied from the CPU 10.

The changing section 102 changes, on the basis of an instruction of the user, the position of at least one correction point among a plurality of correction points set on the image for correction projected by the projection control section 101. When the image for correction is divided into a first rectangular image and a second rectangular image by a straight line, the determining section 103 applies projective transformation to the image for correction such that the image for correction maintains a continuous state in a joining portion of the first rectangular image and the second rectangular image. In this embodiment, the determining section 103 limits a direction of a change of a position by the user concerning any one correction point among the plurality of correction points.

Figure 2:
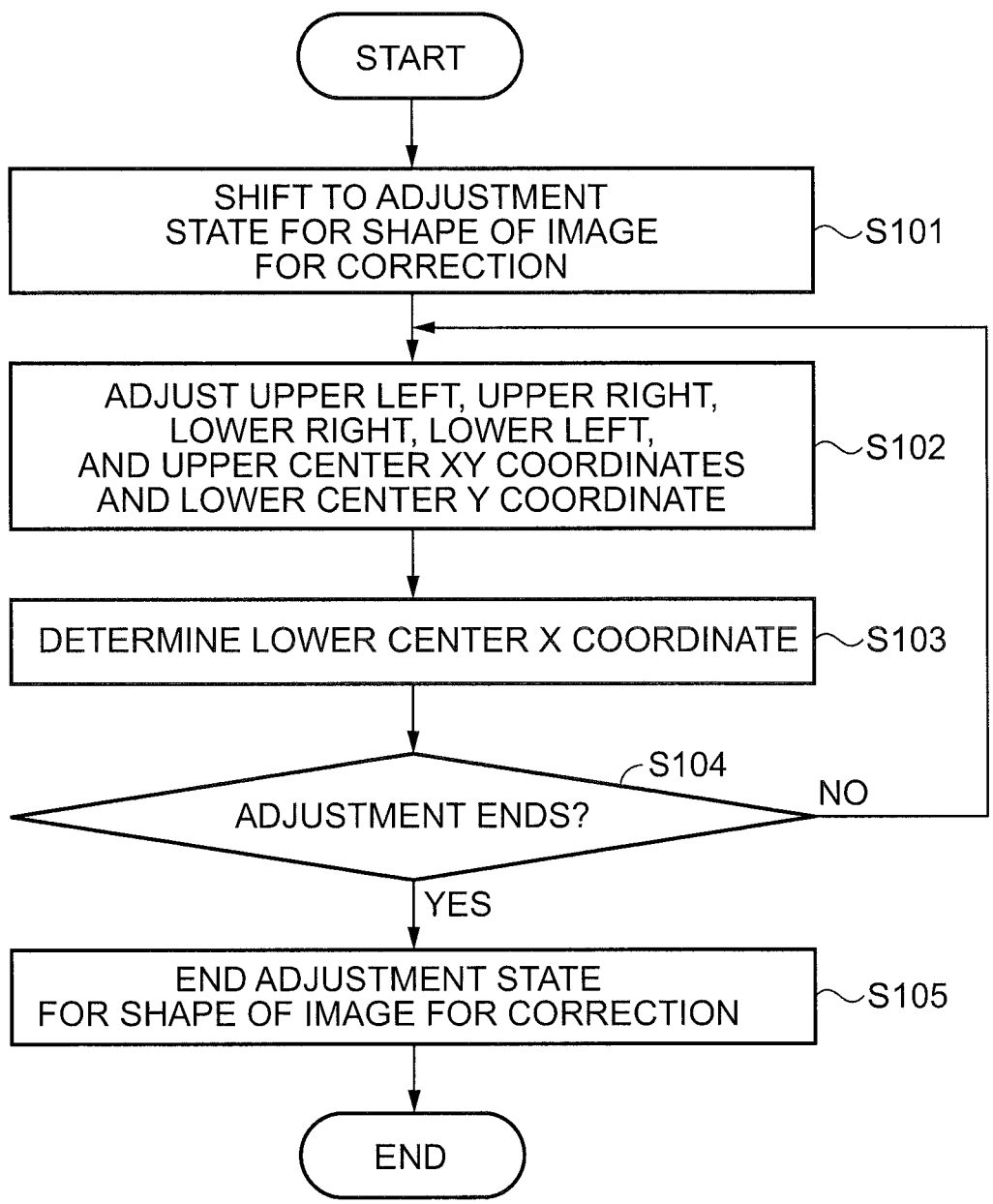
FIG. 2 is a flowchart for explaining distortion correction processing.

FIG. 2 is a flowchart for explaining the distortion correction processing performed by the projector 1. The processing explained below is started by the CPU 10 reading out and executing the control program 20A, for example, when the user operates the controller RC and inputs an instruction for starting the distortion correction processing. In step S101, the CPU 10 shifts to the adjustment state, reads out the image data for correction stored in the ROM 20, and supplies the image data for correction to the projection unit 60. The projection unit 60 projects the image for correction on the screen SC according to the image data for correction supplied from the CPU 10.

Figure 3:
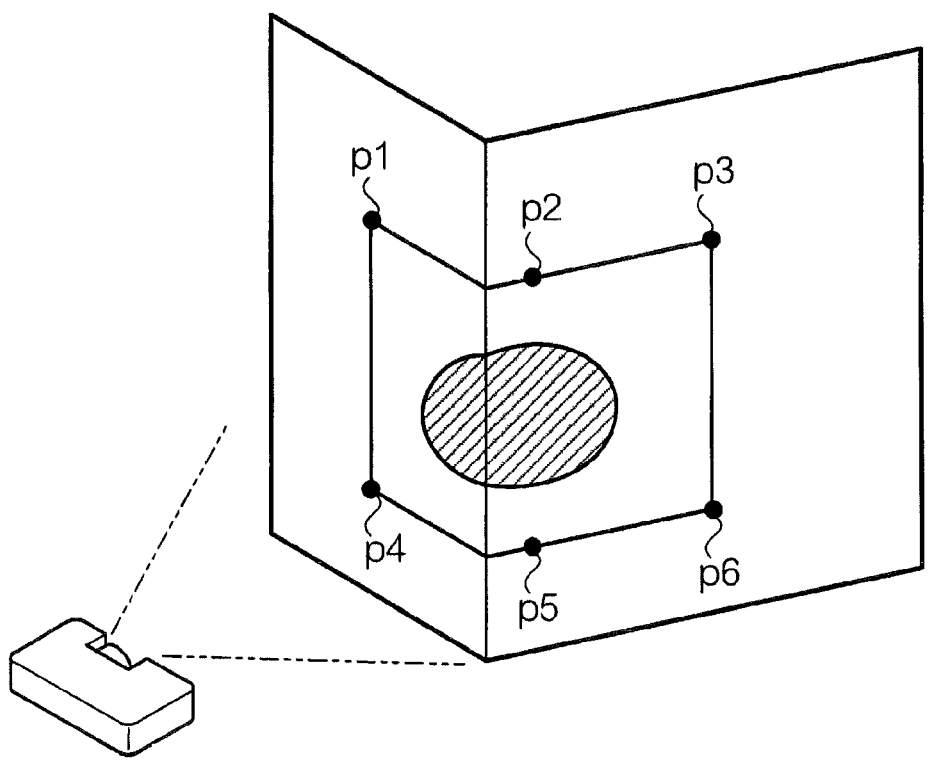
FIG. 3 is a diagram illustrating an image for correction and correction points (initial positions).
Figure 4:
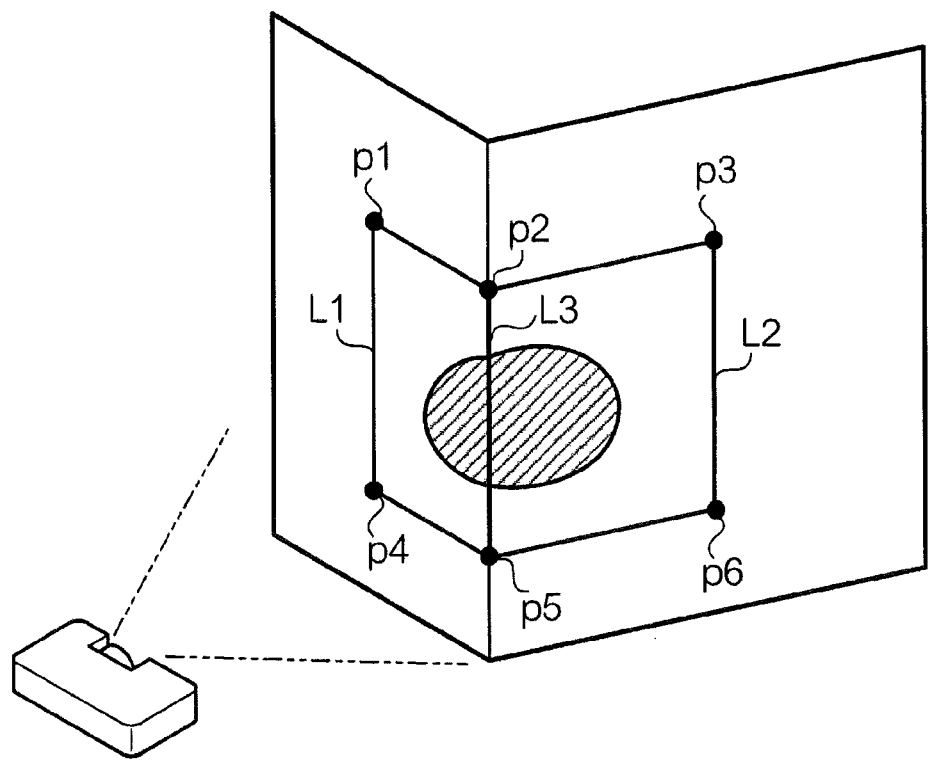
FIG. 4 is a diagram illustrating the image for correction and the correction points (after a setting change for positions).

FIG. 3 is a diagram showing an example of the image for correction projected on the screen SC. In this embodiment, the image for correction is formed in a rectangular shape. Correction points p1, p2, p3, p4, p5, and p6 are set in six places in total, i.e., the four vertexes and the upper side and the lower side. Among the correction points, the correction points p2 and p5 set on the upper side and the lower side are respectively set at the middle point of the upper side and the middle point of the lower side, which are initial positions. The user can move each of the correction point p2 and the correction point p5 in the left right direction on the upper side or the lower side by, for example, operating the controller RC. Usually, as shown in FIG. 4, the user moves the positions of the correction point p2 and the correction point p5 such that the correction point p2 and the correction point p5 are located on a line of intersection of the left surface and the right surface of the screen SC. Consequently, reference positions of the six correction points are set.

When a portion projected on the left surface and a portion projected on the right surface in the image projected on the screen SC are individually subjected to distortion correction, deviation occurs in the joining portion of the image after the distortion correction. A reason for the deviation is explained with reference to the drawings. When an image is projected on a flat projection surface, there is a relation of the projective transformation indicated by the following expression between a point (x, y) forming an original figure and a point (X, Y) forming a figure after the projection. In the expression, A to H are constants set according to a positional relation between the projection surface and a projection axis of the image.

$$(X, Y) = \left( \frac{Ax + By + C}{Gx + Hy + 1}, \frac{Dx + Ey + F}{Gx + Hy + 1} \right) \quad (1)$$

Therefore, desirable values are set in the constants A to H of Expression (1) and, after coordinates of points forming the image are subjected to the projective transformation according to Expression (1), an interpolation arithmetic operation is performed, whereby an image showing a desirable shape when projected on the projection surface (an image after distortion correction) is generated. When an image is projected on a projection surface formed by two planes (a left surface and a right surface) having different angles with respect to a projection axis like the screen SC, it is necessary to apply, using different values of A to H, the projective transformation to a portion projected on the left surface and a portion projected on the right surface in the image.

Figures 5A, 5B:
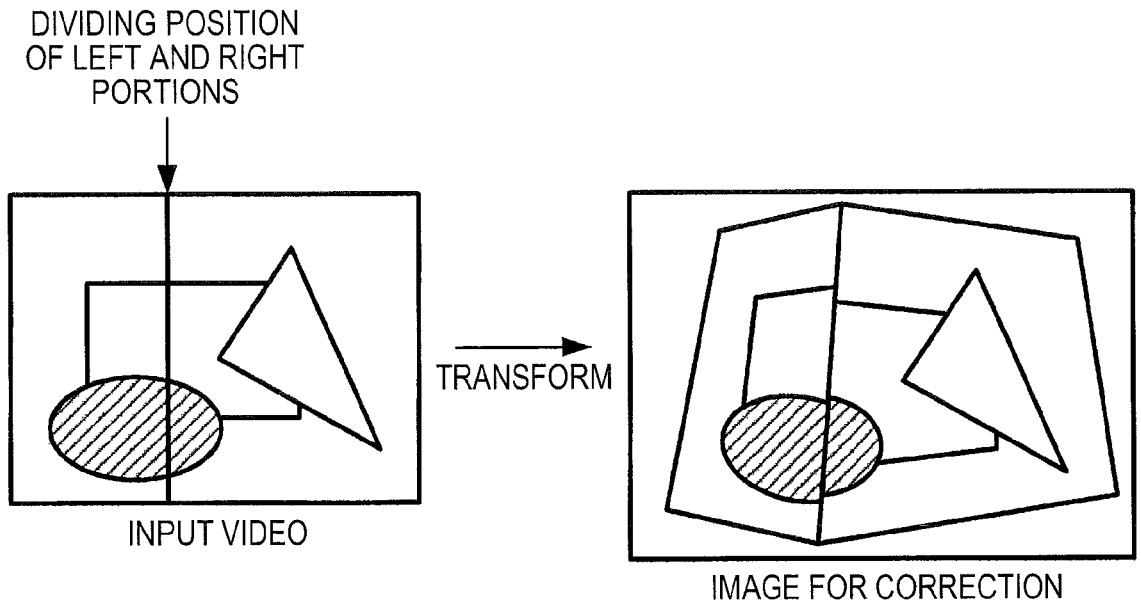
FIGS. 5A and 5B are diagrams showing a state in which the image for correction is subjected to distortion correction.

FIGS. 5A and 5B are diagrams showing a state in which the image for correction is subjected to distortion correction to be projected on the screen SC. FIG. 5A shows the image for correction before the distortion correction and FIG. 5B shows the image for correction after the distortion correction. As shown in FIG. 5B, the portion projected on the left surface and the portion projected on the right surface are respectively subjected to the projective transformation according to different parameters. Therefore, the image does not always continue in a joining portion of the portions.

When two portions obtained by dividing one image by a straight line (hereinafter referred to as "dividing line") are individually subjected to the distortion correction in this way, if the distortion correction is performed such that three straight lines, i.e., the left side and the right side and the dividing line in the entire image after the distortion correction cross at one point, when the left and right two portions individually subjected to the distortion correction are joined, discontinuity does not occur in the joining portion. The shapes of the left and right two portions after the distortion correction are designated by the user operating the controller RC or the like and changing the positions of the correction points in the adjustment state. However, it is not easy for the user to visually change the positions of the correction points to satisfy the conditions explained above. Therefore, the correction points are changed by the user to positions where the conditions are not satisfied. As a result, as shown in FIG. 5B, an image having a discontinuous joining portion is projected.

Therefore, in this embodiment, in order to avoid deviation of the joining portion, the user is allowed to change positions in arbitrary directions concerning five correction points among the correction points p1, p2, p3, p4, p5, and p6. On the other hand, concerning the remaining one correction point, limitation is provided on operation of the correction point by the user to allow the user to set only one of an x coordinate and a y coordinate. As a specific example, in the following explanation, concerning the correction points p1, p2, p3, p4, and p6, the user can change the positions of the correction points by instructing a change of x coordinates and y coordinates of the correction points using the operation panel 80 or the controller RC. On the other hand, concerning the correction point p5, although the user can instruct a change of a y coordinate, the user cannot instruct a change of an x coordinate. The x coordinate of the correction point p5 is automatically determined by the projector 1 to satisfy the conditions.

Referring back to FIG. 2, the explanation of the distortion correction processing performed by the projector 1 is continued. The user designates the shape of the image after the distortion correction by changing the positions of the correction points using the controller RC or the operation panel 80. Specifically, after operating the controller RC or the operation panel 80 to select any one of the correction points p1, p2, p3, p4, p5, and p6, the user performs operation for moving the position of the selected correction point in the x-axis direction or the y-axis direction. However, when the correction point p5 is selected, even if the user performs operation for moving the correction point p5 in the x-axis direction, the operation is not received by the projector 1.

When the CPU 10 receives, from the operation panel 80 or the controller RC, a signal indicating an instruction for selection of a correction point and a change of the position of the selected correction point by the user, the CPU 10 changes, according to the signal, a coordinate of the correction point selected by the user (step S102 in FIG. 2) and, at the same time, determines an x coordinate of the correction point p5 (a correction point in the lower center) (step S103). At that point, the CPU 10 determines the x coordinate of the correction point p5 such that a straight line (i.e., the left side of the image for correction) L1 connecting the correction point p1 and the correction point p4, a straight line (i.e., the right side of the image for correction) L2 connecting the correction point p3 and the correction point p6, and a straight line (i.e., a dividing line) L3 connecting the correction point p2 and the correction point p5 cross at one point. Specifically, for example, the CPU 10 calculates a coordinate of a point of intersection of the left side L1 and the right side L2, specifies an expression representing a straight line connecting the calculated coordinate of the point of intersection and the correction point p2, and substitutes a value of a y coordinate of the correction point p5 in a value of a y coordinate of the specified expression to thereby calculate an x coordinate of the correction point p5.

Figure 6:
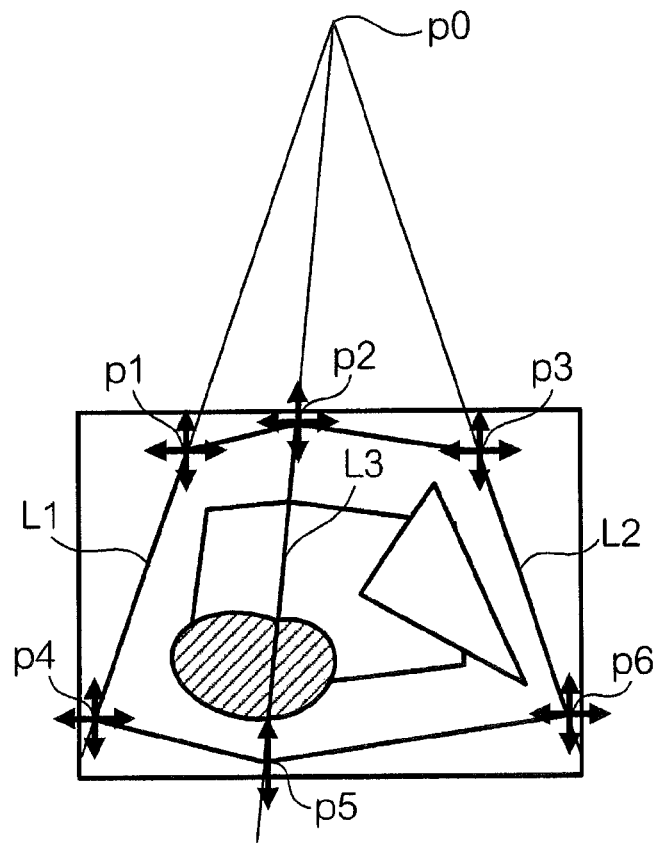
FIG. 6 is a diagram showing an example of a positional relation among the correction points after a change.

FIG. 6 is a diagram showing an example of a positional relation among the correction points p1 to p6 after the change in which the x coordinate of the correction point p5 is determined by the CPU 10 as explained above. As shown in the figure, the x coordinate of the correction point 5 is determined such that the left side L1, the right side L2, and the dividing line L3 of the image for correction after the distortion correction cross at a point p0.

Referring back to FIG. 2, according to an instruction for a change of the position of any one of the correction points by the user, the CPU 10 changes coordinates of the designated correction point and the correction point p5. Then, the CPU 10 changes display positions of the correction points in the image for correction to positions corresponding to the coordinates after the change and applies distortion correction processing to the image for correction according to the coordinates of the correction points after the change. The image for correction subjected to the distortion correction processing in that way is projected on the screen SC. The image for correction without deviation in a joining portion is displayed on the screen SC.

However, the position of the correction point p5 after the change set when the x coordinate is automatically determined by the CPU 10 in step S103 is not always located on a line of intersection of the left surface and the right surface of the screen SC. Therefore, usually, the user repeats the operation for selecting a correction point and changing the position of the selected correction point such that the position of the correction point p5 automatically adjusted by the CPU 10 is present on the line of intersection of the screen SC. The processing in steps S102 and S103 is repeated according to the operation (step S104; NO).

Thereafter, the user operates the operation panel 80 or the controller RC and instructs an end of the adjustment of the positions of the correction points (step S104; YES). Then, the CPU 10 ends the processing of the adjustment state according to a signal received from the operation panel 80 or the controller RC (step S105).

The coordinates of the correction points p1 to p6 after the change determined in the adjustment state as explained above are stored in, for example, the RAM 30 and used as parameters for the distortion correction in projection of a positive image. Specifically, in the projection of the positive image, the CPU 10 subjects a portion on the left side of the positive image (a rectangular portion having the coordinates of the correction points p1, p2, p5, and p4 as vertexes) to the distortion correction processing according to Expression (1) in which the constants A to H are set to perform the projective transformation to transform the coordinates of the correction points p1, p2, p5, and p4 before the change (reference positions) into the coordinates of the correction points p1, p2, p5, and p4 after the change. The CPU 10 subjects a portion on the right side of the positive image (a rectangular portion having the coordinates of the correction points p3, p2, p5, and p6 as vertexes) to the distortion correction processing according to Expression (1) in which the constants A to H are set to perform the projective transformation to transform the coordinates of the correction points p3, p2, p5, and p6 before the change (reference positions) into the coordinates of the correction points p3, p2, p5, and p6 after the change. In this way, the CPU 10 generates the positive image after the distortion correction. The positive image after the distortion correction generated in that way is projected on the screen SC by the projection unit 60. As a result, the positive image without deviation on the dividing line is displayed on the screen SC.

As explained above, in this embodiment, the x coordinate of the correction point p5 is automatically determined by the CPU 10 such that the three straight lines, i.e., the left side L1, the right side L2, and the dividing line L3 cross at one point. As a result, when the image after the distortion correction is projected on the screen SC, the joining portion of the left and right images does not deviate and the left and right images are continuously connected.

MODIFICATIONS

The invention is not limited to the embodiment. Various modifications are possible. Several modifications are explained below. Two or more of the modifications explained below may be used in combination.

(1) Modification 1

In the embodiment, the limitation is provided such that the user cannot designate a change of the x coordinate of the correction point p5. However, instead of the x coordinate of the correction point p5, the y coordinate of the correction point p5 may be set as a coordinate that cannot be changed by the user. In this case, when the change of the x coordinate of the correction point p5 is designated by the user, the CPU 10 determines the y coordinate of correction point p5 on the basis of the designated x coordinate of the correction point p5 and coordinates of the other correction points. That is, the coordinate of the correction point p5 may be determined by any method as long as the position of the correction point p5 is changed to move on the straight line (the dividing line L3) connecting the point of intersection of the left side L1 and the right side L2 of the image for correction and the correction point p2 according to the operation by the user.

A correction point for which limitation is provided concerning a change of a position by the user is not limited to the correction point p5 and may be any one of the correction points p1 to p6. In short, a configuration only has to be adopted in which the user can change the positions of five correction points among the six correction points in arbitrary directions and designation of a change of the remaining one correction point by the user is permitted only in one direction (e.g., the x-axis direction or the y-axis direction).

(2) Modification 2

Figure 7:
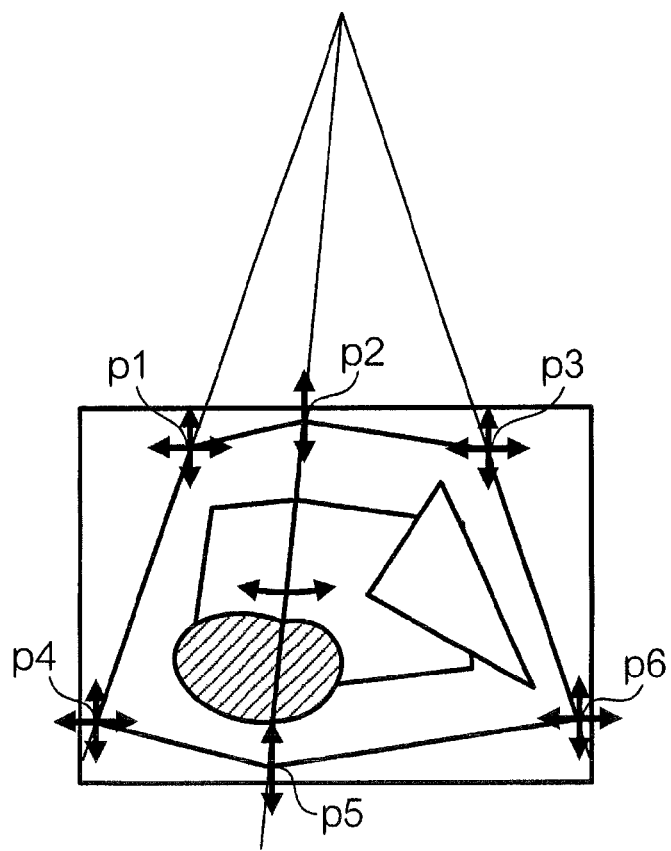
FIG. 7 is a diagram showing an example of limitation in a position change of the correction points by a user.

FIG. 7 is a diagram showing another example of the limitation in the change of the positions of the correction points. In an example shown in FIG. 7, the user can change the coordinates of the correction points p1, p3, p4, and p6 in arbitrary directions. On the other hand, the user can change only the y coordinates of the correction points p2 and p5 and can set a tilt of a straight line connecting the correction point p2 and the correction point p5. In this case, for example, the CPU 10 calculates a coordinate of the point of intersection of the left side L1 and the right side L2 of the image for correction, specifies an expression of the straight line passing the correction points p2 and p5 from the calculated coordinate of the point of intersection and the tilt of the straight line set by the user, and determines x coordinates of the correction points p2 and p5 from the specified expression and the y coordinates of the correction points p2 and p5 set by the user.

(3) Modification 3

In the embodiment, the CPU 10 limits the direction of the change of the position by the user concerning one correction point among the six correction points. However, instead of limiting the direction of the change of the positions of the correction points by the user, guidance for guiding the user to change the positions of the correction points to the positions of the correction points for not causing deviation in a joining portion of an image after the distortion correction (hereinafter referred to as "guide image") may be displayed on the screen SC. Specifically, for example, the CPU 10 specifies, on the basis of the x coordinates and the y coordinates of the correction points p1, p2, p3, p4, and p6 and the x coordinate and the y coordinate of the correction point p5, in which direction and by which distance the correction point 5 should be moved, generates an arrow indicating a specified result or a guide image indicating a message "Please press a moving button to the right three times", and projects the guide image on the projection unit 60 to be overlaid on the image for correction.

As another example, the CPU 10 may specify movement amounts of the correction point p2 and the correction point p5, the positions of which are changed to eliminate deviation of the joining portion, generate a guide image for urging a change of the correction point having a smaller specified movement amount, and cause the projection unit 60 to irradiate light. The CPU 10 does not need to always cause the screen SC to display the guide image in the adjustment state. For example, the CPU 10 may cause the screen SC to display the guide image only when conditions set in advance are satisfied, for example, when a distance between the position of a currently designated correction point and the position of a correction point for not causing deviation of the joining portion is equal to or larger than a predetermined threshold.

(4) Modification 4

In the embodiment, the image including the six correction points is used as the image for correction. However, an image including seven or more correction points may be used as the image for correction. The shape of the image for correction may be a polygonal shape other than the rectangular shape. Even when an image having the polygonal shape other than the rectangular shape is used as the image for correction, as in the embodiment, the CPU 10 only has to determine a coordinate of at least one of the six correction points such that three straight lines defined by the six correction points cross at one point.

(5) Modification 5

In the embodiment, the example in which the main image is divided into the left and right portions by the line of intersection in the vertical direction is explained. However, the invention is also applicable when the main image is divided into upper and lower portions by a line of intersection in the horizontal direction. In this case, the upper side, the lower side, and a dividing line of the image for correction only has to cross at one point.

(6) Modification 6

Figures 8A, 8B:
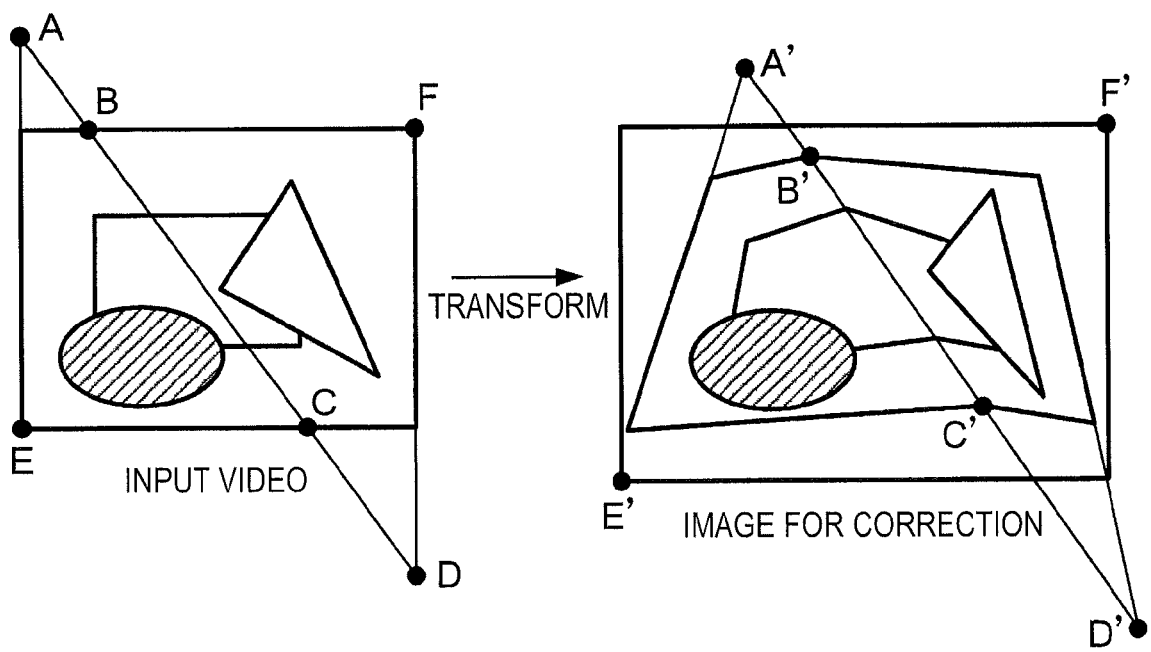
FIGS. 8A and 8B are diagrams for explaining a method of determining the positions of correction points according to a modification.
Figure 9:
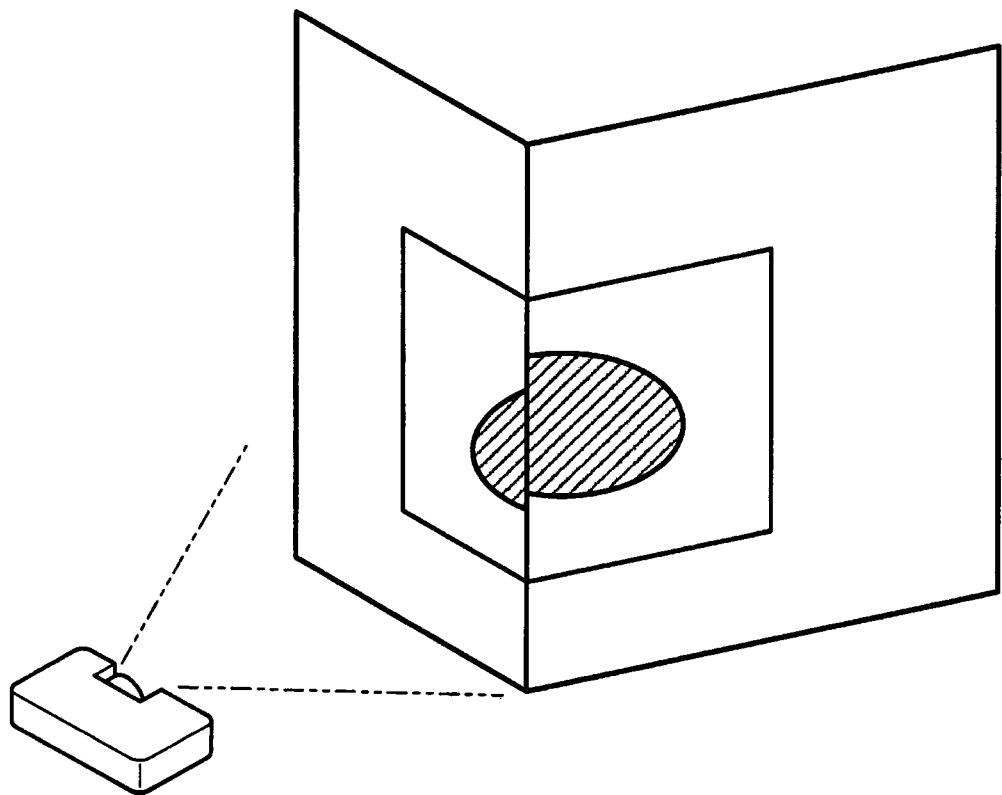
FIG. 9 is a diagram showing an example of an image subjected to distortion correction projected to extend across two surfaces crossing each other at an angle (the related art).

FIGS. 8A and 8B are diagrams showing an example of a method of determining the positions of correction points according to this modification. FIG. 8A is a diagram showing an example of an image for correction before distortion correction. FIG. 8B is a diagram showing an example of an image for correction after the distortion correction. In FIG. 8A, a correction point A indicates a point of intersection of the left side and a dividing line of the image for correction. A correction point B indicates a point of intersection of the upper side and the dividing line of the image for correction. A correction point C indicates a point of intersection of the lower side and the dividing line of the image for correction. A correction point D indicates a point of intersection of the right side and the dividing line of the image for correction. Correction points E and F respectively indicate lower left and upper right vertexes of the image for correction. Correction points A', B', C', D', E', and F' in FIG. 8B are correction points into which the correction points A, B, C, D, E, and F in FIG. 8A are transformed by distortion correction.

When the dividing line in the image before the distortion correction is not perpendicular because of a positional relation between the screen SC and the projection axis, if a compound ratio of the correction points A, B, C, and D does not change before and after the distortion correction, i.e., the following Expression (2) is satisfied, the image does not deviate in a joining portion.

$$\frac{AC}{AD} : \frac{BC}{BD} = \frac{A'C'}{A'D'} : \frac{B'C'}{B'D'} \qquad (2)$$

Therefore, in this modification, the user can designate the positions of five correction points among the six correction points. The CPU 10 determines a coordinate of the remaining one correction point from coordinates of the five correction points designated by the user and Expression (2).

Note that it can be easily proved from general characteristics concerning the projective transformation and the compound ratio (the compound ratio is kept in the projective transformation, the projective transformation on a straight line is uniquely set if three points before and after the transformation are determined, and a fourth point having a given compound ratio with respect to the three points on the straight line is uniquely determined) that the image does not deviate in the joining portion if the compound ratio of the correction points A, B, C, and D does not change.

When a straight line (a straight line BC) connecting the correction point B and the correction point C is changed to be perpendicular, both of the correction point A and the correction point D converge at a point at infinity in the perpendicular direction and the correction point A' and the correction point D' converge at the same one point. That is, a condition for preventing the image from deviating in the joining portion when the straight line BC is perpendicular is that, as explained in the embodiment, an extended line of the straight line BC passes points of intersection of the left side and the right side (the correction points A and D).

(7) Modification 7

The projector 1 is an example of an image processing apparatus according to the invention. The image processing apparatus according to the invention is not limited to the projector and may be other apparatuses such as a PC (personal computer). In this case, for example, the PC only has to perform image correction and output an image after the correction to the projector.

(8) Modification 8

Processing according to the invention is not limited to the processing described in the flowchart explained above. For example, in the example explained in the embodiment, the image for correction is independently projected on the screen SC. However, a combined image obtained by combining the main image and the image for correction may be projected on the screen SC.

(9) Modification 9

A control program 20A executed by the projector 1 in the embodiment may be provided in a state in which the control program 20A is stored in a recording medium such a magnetic recording medium (a magnetic tape, a magnetic disk (a HDD or an FD (Flexible Disk)), etc.), an optical recording medium (an optical disk (a CD (Compact Disk) or a DVD (Digital Versatile Disk)), etc.), a magneto-optical recording medium, or a semiconductor memory (a flash ROM, etc.). The control program 20A may be downloaded through a network such as the Internet.

(10) Other Modifications

The internal configuration of the projector 1 is not limited to the internal configuration explained with reference to FIG. 1. The projector 1 may have any internal configuration as long as the processing in the steps shown in FIG. 2 can be executed.

What is claimed is:
1. An image processing apparatus comprising:
a projection control section configured to cause a projecting device, which projects an image on a projection surface, to project an image for correction including at least six correction points;

a changing section configured to prevent at least one predetermined correction point among the at least six correction points from moving in a predetermined direction according to an instruction of a user, and to change, according to the instruction of the user, a position of the other at least six correction points projected on the projection surface by the projection control section; and a determining section configured to determine the position of the at least one predetermined correction point among the at least six correction points in the predetermined direction such that, when the image for correction is divided into a first image and a second image by a straight line connecting two correction points among the at least six correction points, the image for correction maintains a continuous shape in a joining portion of the first image and the second image.

2. The image processing apparatus according to claim 1, further comprising a processing section configured to perform, on the basis of the position of the correction point determined by the determining section, distortion correction processing for the image for correction that the projection control section causes the projecting device to project.

3. The image processing apparatus according to claim 1, wherein the changing section limits, concerning the at least one predetermined correction point among the at least six correction points, a direction in which the correction points can be moved according to an instruction of the user.

4. The image processing apparatus according to claim 1, wherein
the at least six correction points include six correction points located on an outer frame of the image for correction,
the first image is a rectangular image formed by four correction points including two correction points located on the straight line,
the second image is a rectangular image formed by four correction points including two correction points other than the four correction points among the six correction points and the two correction points located on the straight line, and
when the straight line is represented as first straight line, a straight line connecting the two correction points other than the two correction points located on the first straight line among the four correction points forming the first image is represented as second straight line, and a straight line connecting the two correction points other than the two correction points located on the first straight line among the four correction points forming the second image is represented as third straight line, the determining section determines the position of the at least one predetermined correction point among the six correction points such that the first straight line, the second straight line, and the third straight line cross at one point.

5. The image processing apparatus according to claim 4, wherein the changing section limits, concerning the at least one predetermined correction point among the six correction points, a direction in which the correction point can be moved according to an instruction of the user to a first direction set in advance and the determining section determines a coordinate of the correction point in a second direction set in advance on the basis of positions of the correction points other than the correction point.

6. The image processing apparatus according to claim 4, wherein the changing section limits, concerning two predetermined correction points among two correction points located on the first straight line, two correction points located on the second straight line, and two correction points located on the third straight line, a direction in which the correction points can be moved according to an instruction of the user to a first direction set in advance and the determining section determines coordinates of the two correction points in a second direction set in advance respectively on the basis of positions of the correction points other than the two correction points.

7. The image processing apparatus according to claim 1, wherein the projection control section causes, concerning the correction point, the position of which is determined by the determining section, the projecting device to project an image representing guidance display for moving the position of the correction point, which the projection control section causes the projecting device to project, close to the position determined by the determining section.

8. A projector comprising:
a projecting device configured to project an image on a projection surface;
a projection control section configured to cause the projecting device to project an image for correction including at least six correction points;
a changing section configured to prevent at least one predetermined correction point among the at least six correction points from moving in a predetermined direction according to an instruction of a user, and to change, according to the instruction of the user, a position of the other at least six correction points projected on the projection surface by the projection control section; and
a determining section configured to determine the position of the at least one predetermined correction point among the at least six correction points in the predetermined direction such that, when the image for correction is divided into a first image and a second image by a straight line connecting two correction points among the at least six correction points, the image for correction maintains a continuous shape in a joining portion of the first image and the second image.

9. An image processing method comprising:
causing a projecting device, which projects an image on a projection surface, to project an image for correction including at least six correction points;
preventing at least one predetermined correction point among the at least six correction points from moving in a predetermined direction according to an instruction of a user;
changing, according to the instruction of the user, a position of the other at least six correction points projected on the projection surface; and
determining the position of the at least one predetermined correction point among the at least six correction points in the predetermined direction such that, when the image for correction is divided into a first image and a second image by a straight line connecting two correction points among the at least six correction points, the image for correction maintains a continuous shape in a joining portion of the first image and the second image.

10. An image processing apparatus comprising:
a projection control section configured to cause a projecting device, which projects an image on a projection surface, to project an image for correction including at least six correction points;
a changing section configured to change, according to an instruction of a user, a position of at least one correction point among the at least six correction points projected on the projection surface by the projection control section; and a determining section configured to determine a position of at least one predetermined correction point among the at least six correction points such that, when the image for correction is divided into a first image and a second image by a straight line connecting two correction points among the at least six correction points, the image for correction maintains a continuous shape in a joining portion of the first image and the second image, the at least six correction points include six correction points located on an outer frame of the image for correction, the first image is a rectangular image formed by four correction points including two correction points located on the straight line, the second image is a rectangular image formed by four correction points including two correction points other than the four correction points among the six correction points and the two correction points located on the straight line, and when the straight line is represented as first straight line, a straight line connecting the two correction points other than the two correction points located on the first straight line among the four correction points forming the first image is represented as second straight line, and a straight line connecting the two correction points other than the two correction points located on the first straight line among the four correction points forming the second image is represented as third straight line, the determining section determines the position of the at least one predetermined correction point among the six correction points such that the first straight line, the second straight line, and the third straight line cross at one point.

* * * * *